United States Patent
Sakaguchi et al.

(10) Patent No.: US 8,979,275 B2
(45) Date of Patent: Mar. 17, 2015

(54) DUAL HIGH-PRESSURE DISCHARGE LAMP PROJECTOR WITH MULTI-WAVEFORM CURRENT GENERATION FOR GREATER LUMINOUS FLUX CHANGE CONTROL AND EXTENDED LAMP LIFE

(75) Inventors: Jun Sakaguchi, Osaka (JP); Syunsuke Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 164 days.

(21) Appl. No.: 13/171,205

(22) Filed: Jun. 28, 2011

(65) Prior Publication Data
US 2012/0026471 A1    Feb. 2, 2012

(30) Foreign Application Priority Data
Jul. 30, 2010    (JP) .................. 2010-171660

(51) Int. Cl.
*G03B 21/20* (2006.01)
*G03B 21/14* (2006.01)

(52) U.S. Cl.
CPC ............ *G03B 21/14* (2013.01); *G03B 21/2013* (2013.01); *G03B 21/2026* (2013.01); *G03B 21/206* (2013.01)
USPC .......................................................... 353/84

(58) Field of Classification Search
CPC .................................................. G03B 21/2026
USPC ........ 353/84, 94; 362/235–238; 315/246, 287
See application file for complete search history.

(56) References Cited

U.S. PATENT DOCUMENTS

2009/0213336 A1    8/2009  Takezawa
2010/0148682 A1*   6/2010  Yamauchi et al. ........ 315/209 R

FOREIGN PATENT DOCUMENTS

JP    2009-198940    9/2009
JP    2010-008627    1/2010

* cited by examiner

*Primary Examiner* — Thanh Luu
*Assistant Examiner* — Renee D Chavez

(57) ABSTRACT

The projector uses two lamps, which are high-pressure discharge lamps with the same rated power, as light sources. The projector includes: a first alternating-current generator configured to generate a lamp current to be supplied to one of the lamps, based on an input control signal; a second alternating-current generator configured to generate a lamp current to be supplied to the other lamp, based on an input control signal; and a controller configured to control the lamp currents to have a same period and to be out of phase, by inputting a control signal to each of the first and the second alternating-current generators.

6 Claims, 9 Drawing Sheets

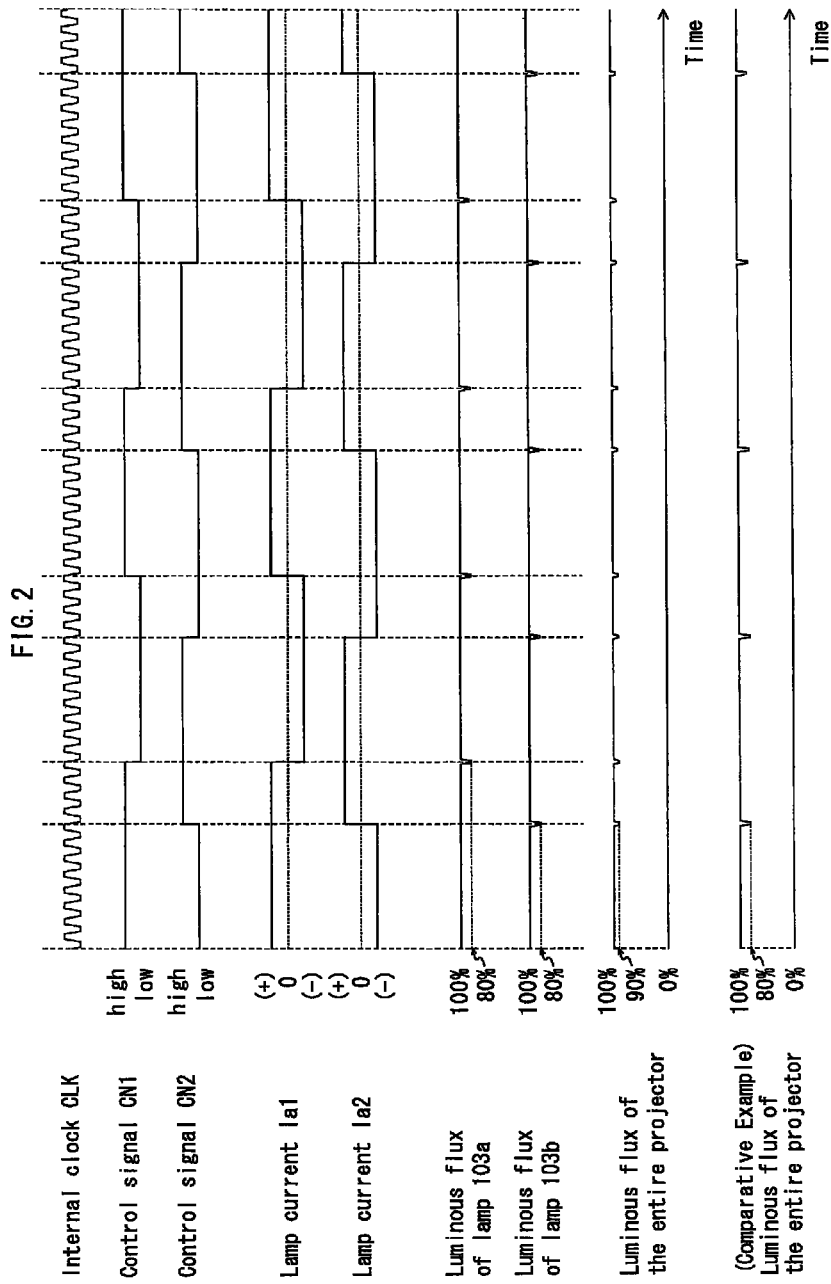

Practical example 1: Phase difference 120°

Practical example 2: Phase difference 195°

Comparative example 1: Phase difference 0°

Comparative example 2: Phase difference 180°

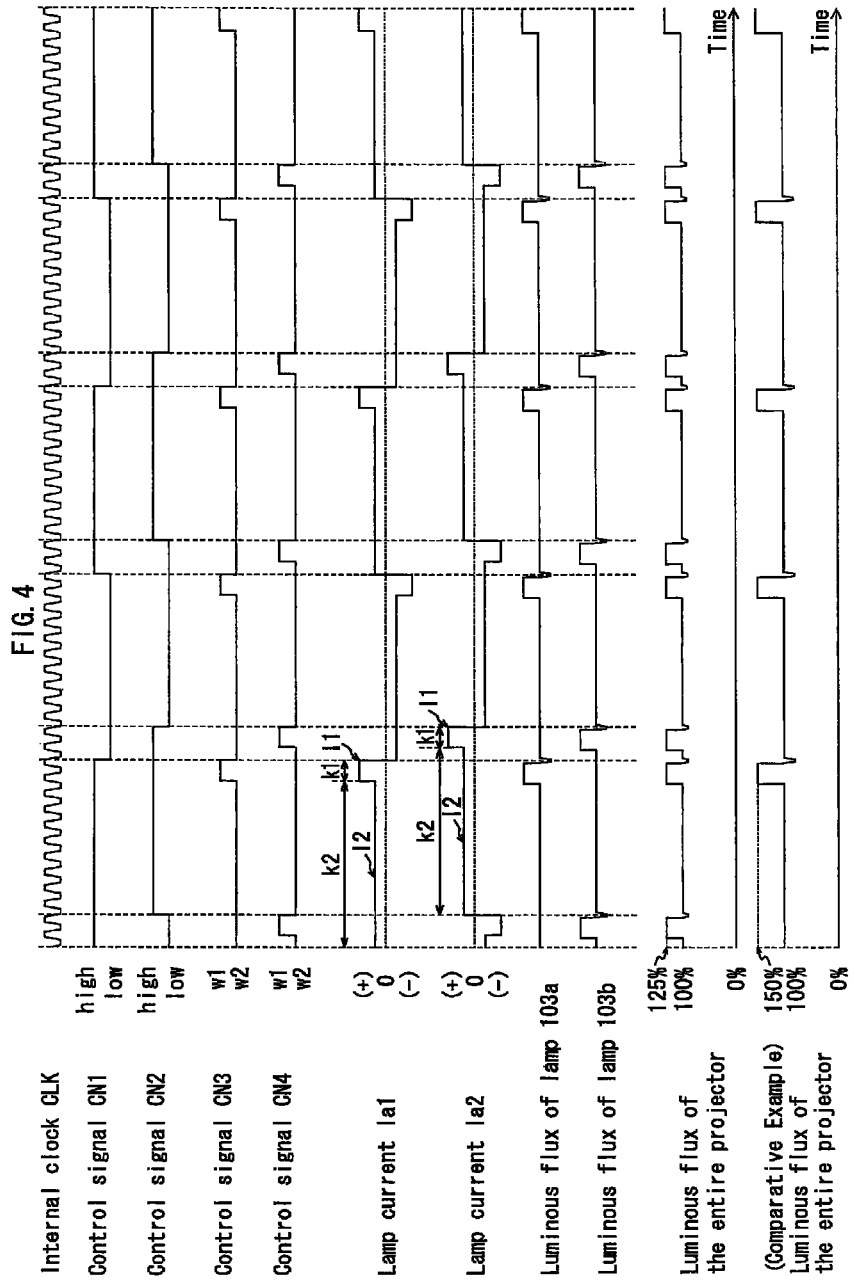

Practical example 3: Phase difference 30°

Practical example 4: Phase difference 90°

Comparative example 4: Phase difference 0°

Comparative example 4: Phase difference 180°

DUAL HIGH-PRESSURE DISCHARGE LAMP PROJECTOR WITH MULTI-WAVEFORM CURRENT GENERATION FOR GREATER LUMINOUS FLUX CHANGE CONTROL AND EXTENDED LAMP LIFE

The disclosure of Japanese Patent Application No. 2010-171660 filed on Jul. 30, 2010 including specification, drawings and claims is incorporated herein by reference in its entirety.

TECHNICAL FIELD

The present invention relates to a projector mainly of a dual-lamp type that uses high-pressure discharge lamps as light sources, a lighting device for a high-pressure discharge lamp used in the projector, and a method for lighting a high-pressure discharge lamp.

BACKGROUND ART

In recent years, projectors are used in halls, movie theaters, and the likes. A dual-lamp projector is used when a single-lamp projector can not achieve required luminance for a large screen in a hall, a movie theater, or the like (e.g. Patent Literature 1).

A dual-lamp projector includes two high-pressure discharge lamps as light sources, and lighting devices which are provided for the high-pressure discharge lamps respectively, and each of which turns on the corresponding high-pressure discharge lamp. Each lighting device includes an alternating-current generator and a controller. The alternating-current generator generates an alternating current having a rectangular waveform to be supplied to the high-pressure discharge lamp, based on an input control signal. The controller controls the alternating-current generator by inputting control signals to the alternating-current generator. Each controller has an internal clock, and generates the control signals based on the internal clock.

In such a dual-lamp projector, either one of the following two methods has been conventionally used for controlling the alternating currents to be supplied to the two high-pressure discharge lamps. One is a synchronous control for synchronizing the two alternating currents by adjusting the phases thereof to conform to each other, and the other is an asynchronous control which does not synchronize the phases.

Generally, a dual-lamp projector is configured to equalize the periods of the alternating currents. However, when the asynchronous control which does not synchronize the phases is used, the alternating currents do not have a same period in some cases, for the following reasons.

In each of the controllers in the projector, the period of the internal clock sometimes changes according to the operating environment and the likes. The change amount of the period of the internal clock is not always the same for each controller. Thus, with the asynchronous control, despite an attempt to equalize the two alternating currents, the periods of the alternating currents to be generated will be different when the change amounts of the periods of the internal clocks have a difference.

CITATION LIST

Patent Literature

[Patent Literature 1] Japanese Patent Application Publication No. 2010-8627

SUMMARY OF INVENTION

Technical Problem

It is known that when a high-pressure discharge lamp is supplied with an alternating current having a rectangular waveform, the luminous flux of the lamp changes when the polarity of the alternating current switches between the positive and the negative. The changes in the luminous flux are caused by the current value instantaneously measuring 0 A at the polarity switching between the positive and the negative.

Here, when the synchronous control, which synchronizes the phases of the alternating currents to be supplied to the two lamps, is used in the conventional dual-lamp projector as described above, their polarity switching is also synchronized. Thus, the changes in the luminous fluxes of the two lamps occur at the same time, which causes the luminous flux of the entire projector to change greatly.

On the other hand, when the asynchronous control is used, which does not synchronize the phases, the polarity switching occurs with different timing between the two alternating currents, in most cases. When the polarity switching occurs with different timing between the two alternating currents, the changes in the luminous fluxes of the two lamps do not occur at the same time. Thus, the change in the luminous flux in terms of the entire projector is smaller than the case of the synchronous control which synchronizes the phases. Specifically, since the change in the luminous flux of the entire projector is no greater than the change in the luminous flux of either one of the lamps, the change in the luminous flux is almost a half of the change in the case of the synchronous control. However, even when the asynchronous control is used, if the periods of the two alternating currents are different, the polarity switching occurs at the same time at regular time intervals each equal to the least common multiple of their respective periods. If this is the case, as with the case of the synchronous control which synchronizes the phases, the changes in the luminous fluxes of the two lamps occur at the same time. This causes the luminous flux of the entire projector to change greatly.

The present invention is conceived in view of the circumstances as described above, and aims to provide a projector with reduced luminous flux changes, a lighting device for a high-pressure discharge lamp used in the projector, and a method for lighting a high-pressure discharge lamp.

Solution to Problem

To solve the problem above, one aspect of the present invention is a projector using first and second high-pressure discharge lamps as light sources, comprising: a first alternating-current generator configured to generate a first alternating current to be supplied to the first high-pressure discharge lamp, based on an input control signal; a second alternating-current generator configured to generate a second alternating current to be supplied to the second high-pressure discharge lamp, based on an input control signal; and a controller configured to control the first and the second alternating currents to have a same period and to be out of phase, by inputting a control signal to each of the first and the second alternating-current generators.

Another aspect of the present invention is a lighting device for supplying alternating currents to, and thereby lighting, first and second high-pressure discharge lamps, comprising: a first alternating-current generator configured to generate a first alternating current to be supplied to the first high-pressure discharge lamp, based on an input control signal; a second alternating-current generator configured to generate a second alternating current to be supplied to the second high-pressure discharge lamp, based on an input control signal; and a controller configured to control the first and the second alternating currents to have a same period and to be out of phase, by inputting a control signal to each of the first and the second alternating-current generators.

Another aspect of the present invention is a method for lighting a high-pressure discharge lamp, employed in a lighting device having: a first alternating-current generator configured to generate a first alternating current to be supplied to a first high-pressure discharge lamp, based on an input control signal; a second alternating-current generator configured to generate a second alternating current to be supplied to a second high-pressure discharge lamp, based on an input control signal; and a controller configured to control the first and the second alternating-current generators, the method comprising the step of: inputting a control signal to each of the first and the second alternating-current generators to control the first and the second alternating currents to have a same period and to be out of phase.

Advantageous Effects of Invention

In the projector having the stated structure, the controller controls the first and the second alternating currents to have a same period and to be out of phase. In other words, the controller synchronizes the first and the second alternating currents such that the first and the second alternating currents are always out of phase.

Consequently, the timing of the polarity switching is always different between the first alternating current and the second alternating current. Therefore, the luminous flux of the first high-pressure discharge lamp and the luminous flux of the second high-pressure discharge lamp do not change at the same time, and thus changes in the luminous flux of the entire projector are smaller than the first and the second conventional control methods described above.

Also, in the lighting device having the stated structure, as with the projector described above, the luminous flux of the first high-pressure discharge lamp and the luminous flux of the second high-pressure discharge lamp do not change at the same time, and thus changes in the luminous flux of the entire projector are reduced.

Also, the high-pressure discharge lamp lighting method with the stated structure achieves the same advantageous effects as the lighting device of the high-pressure discharge lamp described above.

BRIEF DESCRIPTION OF DRAWINGS

FIG. 2 is a timing chart showing control signals, lamp currents, and luminous fluxes of lamps pertaining to Embodiment 1.

FIG. 4 is a timing chart showing control signals, lamp currents, and luminous fluxes of lamps pertaining to Embodiment 2.

DESCRIPTION OF EMBODIMENTS

The following describes embodiments of the present invention in detail, with reference to the drawings.

Embodiment 1

Structure

Figure 1:
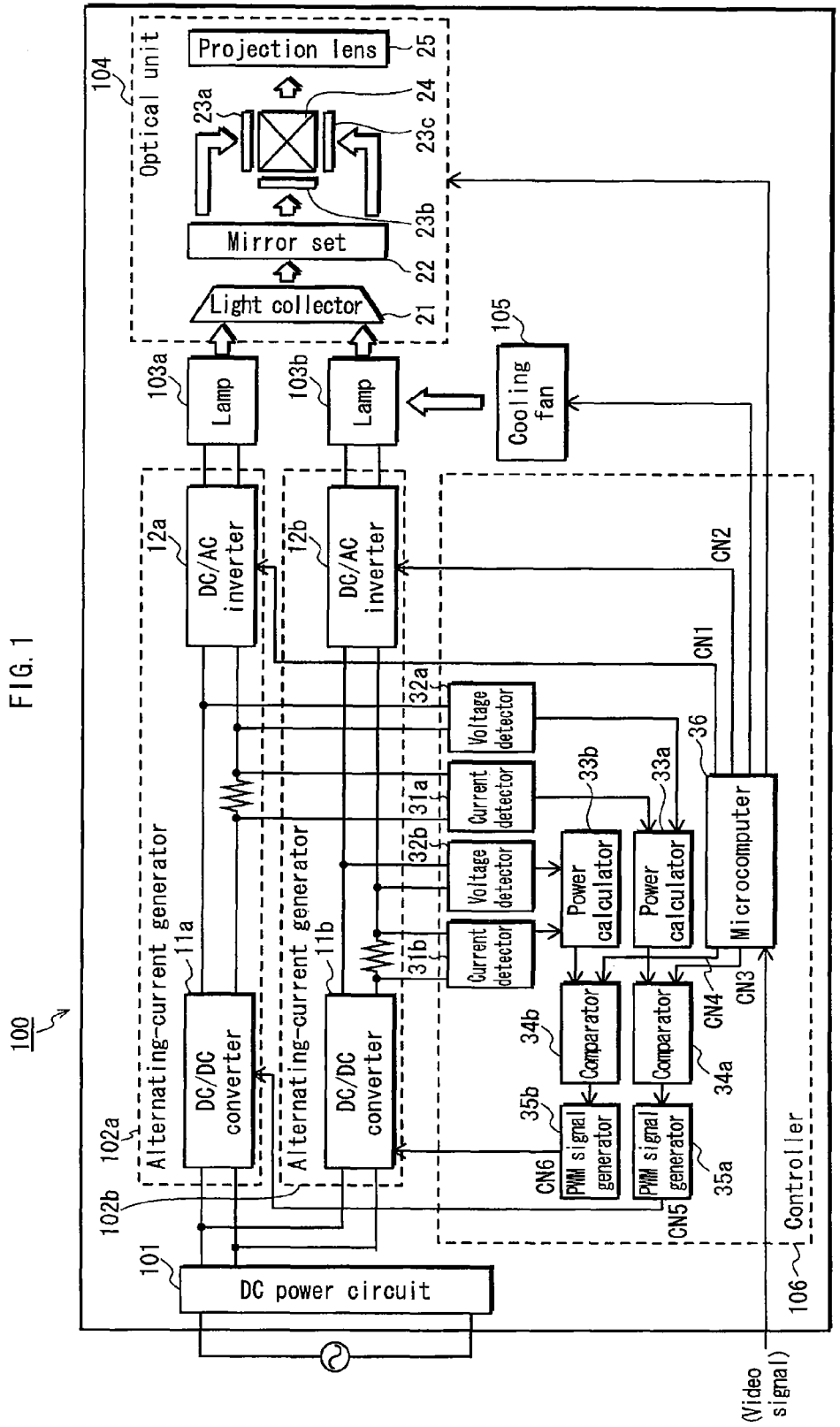
FIG. 1 is a functional block diagram showing the structure of a dual-lamp projector pertaining to Embodiment 1.

FIG. 1 is a functional block diagram showing the structure of a dual-lamp projector pertaining to Embodiment 1 of the present invention.

The projector 100 includes a DC power circuit 101, alternating-current generators 102a and 102b, lamps 103a and 103b, an optical unit 104, a cooling fan 105, and a controller 106.

The DC power circuit 101 is composed of a diode bridge and a smoothing capacitor, for example, and rectifies and smoothes a 50 Hz or 60 Hz alternating current to obtain a direct current.

The alternating-current generator 102a includes a DC/DC converter 11a and a DC/AC inverter 12a. The DC/DC converter 11a outputs a direct current of a magnitude that is based on a control signal CN5. The DC/AC inverter 12a outputs a direct current having a frequency and a phase that are based on a control signal CN1. The DC/DC converter 11a and the DC/AC inverter 12a are cascaded. Hence, the alternating-current generator 102a generates an alternating current having the magnitude, the frequency and the phase that are based on the control signals CN1 and CN5.

The alternating-current generator 102b has the same structure as the alternating-current generator 102a. Hence, the alternating-current generator 102b generates an alternating current having the magnitude, the frequency and the phase that are based on the control signals CN2 and CN6.

The lamps 103a and 103b are high-pressure discharge lamps with the same rated power.

Each of the lamps 103a and 103b is disposed inside a reflecting mirror having a concave shape, and constitutes a lamp unit along with the reflecting mirror. The two lamp units are disposed such that the apertures of their respective reflecting mirrors face each other. Rays of light emitted from the lamps 103a and the 103b are reflected off the reflecting mirrors and are thus collected. Note that the lamp units in are omitted from FIG. 1 for simplification. FIG. 1 only shows the lamps 103a and 103b, which are components of the lamp units. Also note that FIG. 1 shows a schematic view of the arrangement of the components such as 103a and 103b, and does not precisely show the actual arrangement.

The optical unit 104 includes a light collector 21, a mirror set 22, liquid crystal panels 23a, 23b and 23c, a prism 24 and a projection lens 25. The light collector 21 is composed of a combining prism and a rod integrator. The combining prism is disposed between the lamps 103a and 103b which face each other. The combining prism collects (i.e. combines) rays of light emitted from the lamps 103a and 103b by refracting each ray, and causes the rays to enter the rod integrator. The rod integrator subjects the incident light to multiple reflection, thereby rendering the light intensity distribution uniform.

The mirror set 22 is composed of dichroic mirrors, for example, and separates while light into colors of red, green and blue. The liquid crystal panels 23a, 23b and 23c are transmissive panels, and generate red, green and blue images based on their corresponding control signals. The prism 24 combines the images of the colors which have been generated by the liquid crystal panels. The projection lens 25 outputs the combined image.

The cooling fan 105 is provided for cooling the lamps 103a and 103b.

The controller 106 includes current detectors 31a and 31b, voltage detectors 32a and 32b, power calculators 33a and 33b, comparers 34a and 34b, PWM signal generators 35a and 35b, and a microcomputer 36.

The current detector 31a samples the direct current that flows from the DC/DC converter 11a to the DC/AC inverter 12a at predetermined intervals, and outputs the detected current values. In this description, the direct current detected by the current detector 31a is assumed as equivalent to the lamp current to be supplied to the lamp 103a.

The voltage detector 32a samples the output voltage from the DC/DC converter 11a at predetermined intervals, and outputs the detected voltage values. In this description, the direct current voltage detected by the voltage detector 32a is assumed as equivalent to the lamp voltage to be supplied to the lamp 103a.

The power calculator 33a obtains' direct current power values at predetermined intervals, by multiplying the detected direct current values by the detected direct current voltage values, respectively. The direct current power is the lamp power to be supplied to the lamp 103a.

The comparator 34a obtains the difference between the target power indicated by the control signal CN3 and the direct current power at the present point in time, at predetermined intervals.

The PWM signal generator 35a generates the control signal CN5 used for PWM control on the DC/DC converter 11, so as to reduce the difference obtained by the comparator 34a, which is the difference between the target power and the direct current power at the present point in time.

The current detector 31a, the voltage detectors 32a, the power calculator 33a, the comparator 34a and the PWM signal generator 35a constitute a feedback circuit. Thus the magnitude of the direct current output from the DC/DC converter 11a is appropriately adjusted so that the power supplied to the lamp 103a will be the target power.

Similarly, the current detector 31b, the voltage detectors 32b, the power calculator 33b, the comparator 34b and the PWM signal generator 35b constitute a feedback circuit. Thus the magnitude of the direct current output from the DC/DC converter 11b is appropriately adjusted so that the power supplied to the lamp 103b will be the target power.

The microcomputer 36 has a function of generating the control signals CN1, CN2, CN3 and CN4, and a function of driving the cooling fan 105, and a function of driving the liquid crystal panels 23a, 23b and 23c based on the video signals that are externally input thereto.

The alternating-current generator 102a and 102b and the controller 106 having the stated structures serve as a lighting device for providing alternating current to, and thereby lighting, the lamps 103a and 103b.

<Waveform>
FIG. 2 is a timing chart showing the control signals, lamp currents and luminous fluxes of lamps, pertaining to Embodiment 1.

The internal clock CLK is an output signal from a built-in clock of the microcomputer 36.

The control signal CN1, such as a first control signal, is generated by the microcomputer 36 counting the internal clock CLK with a counter and dividing the frequency of the internal clock CLK. The DC/AC inverter 12a applies positive current when the control signal CN1 is at the high level, and applies negative current when the control signal CN1 is at the low level. Hence, the period and the phase of the control signal CN1 coincide with the period and the phase of the alternating current supplied to the lamp 103a, respectively (see the lamp current la1). For example, when the target period of the alternating current is 10 ms (i.e. 100 Hz in terms of frequency), the counter is to be set so that the period of the control signal CN1 will be 10 ms.

The control signal CN2, such as a second control signal, is generated by the microcomputer 36 counting the internal clock CLK with a counter and dividing the frequency of the internal clock CLK. Hence, the period and the phase of the control signal CN2 coincide with the period and the phase of the alternating current supplied to the lamp 103b, respectively (see the lamp current la2).

The control signal CN1 and the control signal CN2 are adjusted such that their periods will be the same and their phases will be different by 120°. The control signal CN1 and the control signal CN2 are in synchronization, because they are generated based on the same internal clock, CLK.

As shown in FIG. 2, when the lamps 103a and 103b are turned on by applying alternating current and using the control signals CN1 and CN2, the luminous fluxes of the lamps change at the switching of the lamp currents la1 and la2 between the positive and the negative. In this example, the change rates of the lamps 103a and 103b are 20%. However, since the control signals CN1 and CN2 are out of phase, the switching of the lamp current la1 and the switching of the lamp current la2 do not occur at the same time. Hence the changes of their respective luminous fluxes occur at different points in time. Therefore, the change rate of the total of the luminous fluxes of the lamps 103a and 103b is suppressed to 10%.

In contrast, when the control signals CN1 and CN2 are in phase, the switching of the lamp current la1 and the switching of the lamp current la2 occur at the same time. Hence the changes of their respective luminous fluxes occur at the same points in time. Therefore, as shown in the comparative example in FIG. 2, the change rate of the total of the luminous fluxes of the lamps 103a and 103b will be 20%.

As described above, the present embodiment controls the alternating currents to be supplied to the lamp 103a and 103b so that their periods are the same and their phases are shifted from each other. This suppresses the change rate of the total of the luminous fluxes of the lamps 103a and 103b.

Note that, in order to make the alternating currents switch between the positive and the negative at different points in time from each other, it is possible to simply generate the alternating currents by using the asynchronous control. In the case of the asynchronous control, however, there is no assurance that the change amounts of the periods of the alternating currents are the same, due to the operating environment and the likes. Hence, due to the slight difference between the change amounts of the periods, the switching points, between the positive and the negative, of the alternating currents are gradually shifted from each other as time passes, and thus they coincide at regular time intervals each equal to the least common multiple of their respective periods.

By contrast, in the present embodiment, the alternating currents supplied to the lamps 103a and 103b are generated based on the same internal clock, CLK. Thus, even when the periods of the internal clock CLK vary according to the operating environment and the likes, each alternating current is affected in the same manner, and changes by the same amount. Therefore, the switching points of the alternating currents do not coincide with each other.

<Demonstration>

The following describes the results of experiments demonstrating the effect of suppressing the changes in the luminous flux of the dual-lamp projector pertaining to Embodiment 1.

In this demonstration experiment, four projectors 100 including two practical examples and two comparative examples were prepared, and the changes in the luminous flux were observed. The four projectors are the same in period of the alternating currents to be supplied to the lamps 103a and 103b, but are different in phase difference.

The phase differences of the practical examples 1 and 2 were set at 120° and 195°, respectively. Thus, in each practical example, the switching points of the alternating currents do not coincide. The phase differences of the comparative examples 1 and 2 were set at 0° and 180°, respectively. Thus, in each comparative example, the switching points of the alternating currents coincide. The period of each alternating current is 10 ms (i.e. 100 Hz in terms of frequency), and the current value thereof is 4 A. As the lamps 103a and 103b, high-pressure discharge lamps each having a rated lamp power of 300 W were used.

Specifically, in this demonstration experiment, for each of the practical and comparative examples, light emitted from the projector 100 onto the screen was measured for a predetermined time with an illuminometer, and changes in the illuminance (i.e. output voltage) were observed on an oscilloscope. Since the illuminance is a physical amount indicating an amount of a incident luminous flux per unit area, the changes in the illuminance can be considered as the changes in the luminous flux.

FIGS. 3A-3D show the results of the observation viewed on an oscilloscope.

Each of FIGS. 3A-3D shows the changes in the illuminance and the waveforms of the lamp currents Ia1 and Ia2. In each drawing, the horizontal axis shows the time (ms) and the vertical axis shows the voltage value (mV) and the current value (A). The distortion in the lamp currents Ia1 and Ia2 (immediately after the switching points between the positive and the negative) are caused due to overshoot.

Figure 3A:
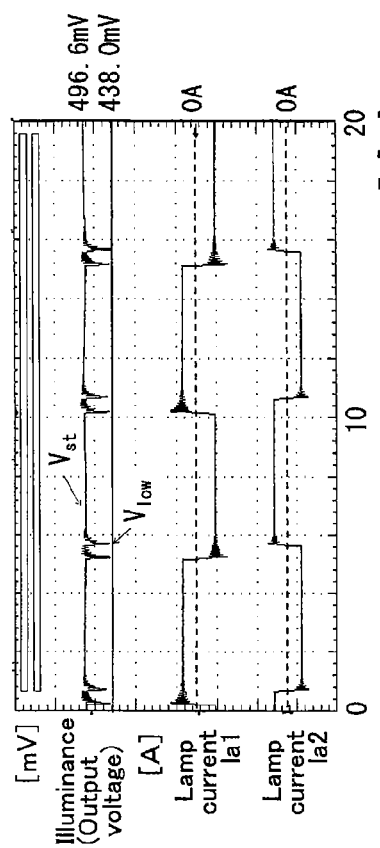
FIGS. 3A-3D show changes in the luminous flux of the projector viewed on an oscilloscope.

As shown in FIG. 3A, in the practical example 1, the normal value $V_{st}$ of the illuminance excluding values at the switching points between the positive and the negative of the lamp currents Ia1 and Ia2 (hereinafter simply referred to as "the normal value $V_{st}$ of the illuminance) is 496.6 mV, and the minimum value $V_{low}$ of the illuminance at the switching points between the positive and the negative (hereinafter simply referred to as "the minimum value $V_{low}$ of the illuminance) is 438.0 mV. Thus, the illuminance decreases (changes) at the switching points of the lamp currents Ia1 and Ia2 by 58.6 mV, and the change rate is 11.8%.

Figure 3B:
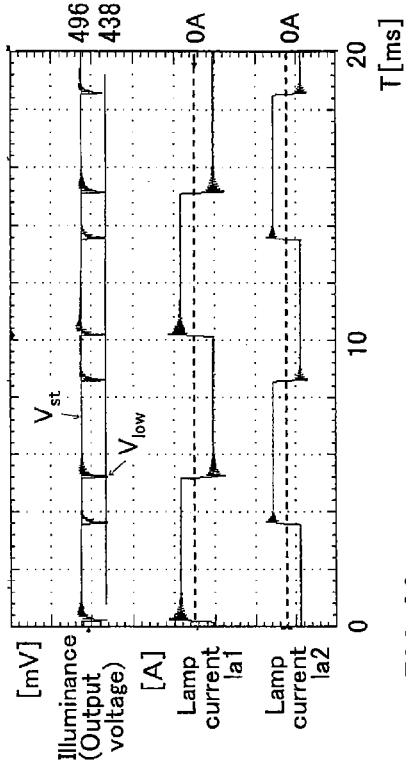

As shown in FIG. 3B, in the practical example 2, the normal value $V_{st}$ of the illuminance is 496.6 mV, the minimum value $V_{low}$ of the illuminance is 438.0 mV, the decrease (change) in the illuminance is 58.6 mV, and the change rate is 11.8%.

Figure 3C:
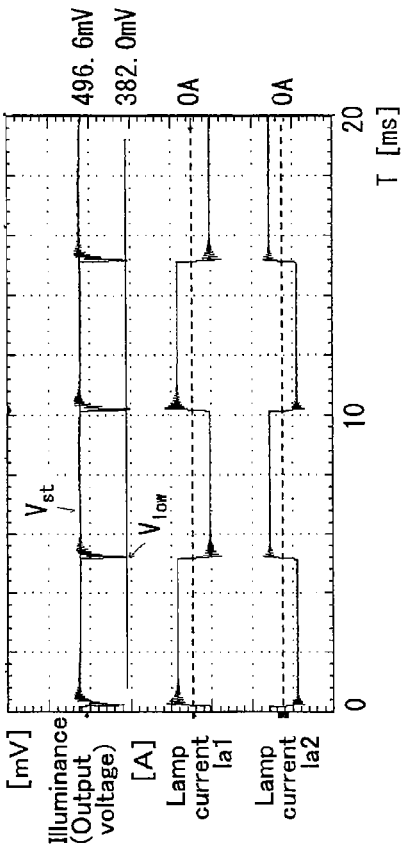
Figure 3D:
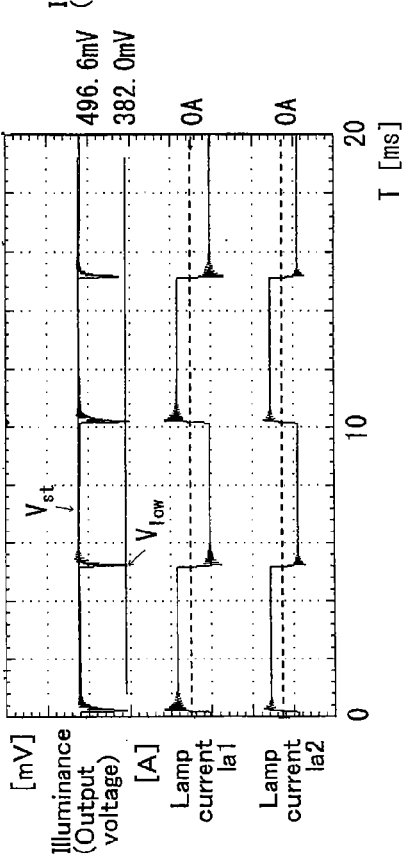

As shown in FIGS. 3C and 3D, in the comparative examples 1 and 2, the normal value $V_{st}$ of the illuminance is 496.6 mV, the minimum value $V_{low}$ of the illuminance is 382.0 mV, the decrease (change) in the illuminance is 114.6 mV, and the change rate is 23.1%.

Comparing the practical examples 1 and 2 with the comparative examples 1 and 2, the change rate (11.8%) of the illuminance of the practical examples 1 and 2 are as low as a half of the change rate (23.1%) of the illuminance of the comparative examples 1 and 2. In this way, when the switching points of the lamp currents Ia1 and Ia2 do not coincide with each other, the change in the illuminance, that is, the change in the luminous flux is smaller than when the switching points coincide.

Comparing the practical example 1 and the practical example 2, the change rate of the illuminance is the same. Thus, it can be said that the same effect can be achieved even when the phase differences are not the same, as long as the switching points of the lamp currents Ia1 and Ia2 do not coincide.

Embodiment 2

Outline

The following describes Embodiment 2 of the present invention.

In Embodiment 1, the current values of the alternating currents supplied to the lamps are constant during the half cycle (see the lamp currents Ia1 and Ia2 in FIG. 2). In contrast, in Embodiment 2, the current values of the alternating currents are raised in a certain interval in the half cycle, so that the current values are higher in the interval than in the rest of the half cycle. The other features are the same as the Embodiment 1. Thus, for simplification, the following describes Embodiment 2 by using the projector 100 pertaining to Embodiment 1.

<Waveform>

FIG. 4 is a timing chart showing the control signals, lamp currents and luminous fluxes of lamps, pertaining to Embodiment 2.

As shown in FIG. 4, in the half cycles of the lamp currents Ia1 and Ia2, control (hereinafter called "raising control") is performed such that a current value I1 in a terminal interval k1 before the polarity switching will be greater than a current value I2 in the rest of the half cycle, namely, an interval k2.

The raising control on the current values is performed in the following manner. Note that the same contents as with the timing chart in FIG. 2 are omitted for simplification.

In the microcomputer 36, two power values to be used as target lamp-power values (i.e. a high-power value W1 and a low-power value W2) are registered as basic information.

The control signals CN3 and CN4 each indicate a target lamp-power value.

The control signal CN3 is generated by the microcomputer 36 counting the internal clock CLK by using its counter, such that, in each half cycle of the lamp current Ia1, the power value will be the low power value W2 till a predetermined count and afterwards will be the high power value W1. The comparator 34a outputs, to the PWM signal generator 35a, the difference between the target power indicated by the control signal CN3 and the direct current power at the present point in time obtained by the power calculator 33a. The PWM signal generator 35a generates the control signal CN5 and thus the DC/DC converter 11a outputs a direct current. The magnitude (i.e. current value) of the output current is I2 when the control signal CN3 indicates the low power value W2, and is I1 when the control signal CN3 indicates the high power value W1.

Similarly, the control signal CN4 is generated by the microcomputer 36 counting the internal clock CLK by using its counter, such that, in each half cycle of the lamp current Ia2, the power value will be the low power value W2 till a predetermined count and afterwards will be the high power value W1. The comparator 34b outputs, to the PWM signal generator 35b, the difference between the target power indicated by the control signal CN4 and the direct current power at the present point in time obtained by the power calculator 33b. The PWM signal generator 35b generates the control signal CN6 and thus the DC/DC converter 11b outputs a direct current. The magnitude (i.e. current value) of the output current is I2 when the control signal CN4 indicates the low power value W2, and is I1 when the control signal CN4 indicates the high power value W1.

In this embodiment, the control signal CN1 and the control signal CN2 are adjusted such that their periods will be the same and their phases will be different by 30°. This is for preventing the raises of the lamp currents Ia1 and Ia2 from overlapping with each other when the lengths of the raises (i.e. terminal interval k1) equal to ¹⁄₂₄ cycle, which is 15° in terms of phase.

As shown in FIG. 4, when the lamps 103a and 103b are turned on by applying alternating current and using the control signals CN3 and CN4, the luminous fluxes of the lamp currents Ia1 and Ia2 will be greater in the terminal interval k1 than in the interval k2, in each half cycle of the lamp currents Ia1 and Ia2. In this example, the change rates of the lamps 103a and 103b are 50%. However, since the control signals CN3 and CN4 are out of phase, the raises of the lamp currents Ia1 and Ia2 do not overlap each other. Hence the changes of their respective luminous fluxes occur at different points in time. Therefore, the change rate of the total of the luminous fluxes of the lamps 103a and 103b is suppressed to 25%.

In contrast, when the control signals CN3 and CN4 are in phase, the terminal interval k1 of the lamp currents Ia1 and Ia2 overlap in each half cycle. Hence the changes of their respective luminous fluxes occur at the same points in time. Therefore, as shown in the comparative example in FIG. 4, the change rate of the total of the luminous fluxes of the lamps 103a and 103b will be 50%.

The control signals CN1 and CN2 are out of phase in this embodiment as well, and thus the change rate of the total of the luminous fluxes of the lamps 103a and 103b at the polarity switching of the lamp currents Ia1 and Ia2 is suppressed.

<Demonstration>

The following describes the results of experiments demonstrating the effect of suppressing the changes in the luminous flux of the dual-lamp projector pertaining to Embodiment 2.

This demonstration experiment was conducted by observing the changes in the luminous flux in the same manner as with Embodiment 1.

Also in this demonstration experiment, two practical examples and two comparative examples were prepared. They are the same in period of the alternating current to be supplied to the lamps 103a and 103b, and are different in phase difference.

The phase differences of the practical examples 3 and 4 were set at 30° and 90°, respectively. Thus, in each practical example, the switching points of the alternating currents do not coincide. The phase differences of the comparative examples 3 and 4 were set at 0° and 180°, respectively. Thus, in each comparative example, the switching points of the alternating currents coincide. The period of each alternating current is 10 ms (i.e. 100 Hz in terms of frequency), the current value I1 is 8 A, and the current value I2 is 4 A.

FIGS. 5A-5D show the results of the observation of the practical examples and the comparative examples, viewed on an oscilloscope.

Figure 5A:
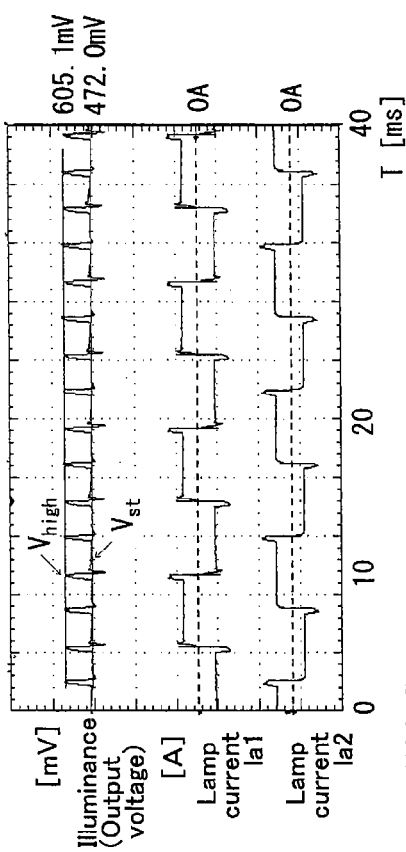
FIGS. 5A-5D show changes in the luminous flux of the projector viewed on an oscilloscope.

As shown in FIG. 5A, in the practical example 3, the normal value $V_{st}$ of the illuminance excluding values at the raises of the lamp currents Ia1 and Ia2 is 472.0 mV, and the maximum value $V_{high}$ of the illuminance at the raises (hereinafter simply referred to as "the maximum value $V_{high}$ of the illuminance) is 601.1 mV. Thus, at the raises of the lamp currents Ia1 and Ia2, the illuminance increases (changes) by 129.1 mV, the change rate thereof is 27.4%.

Figure 5B:
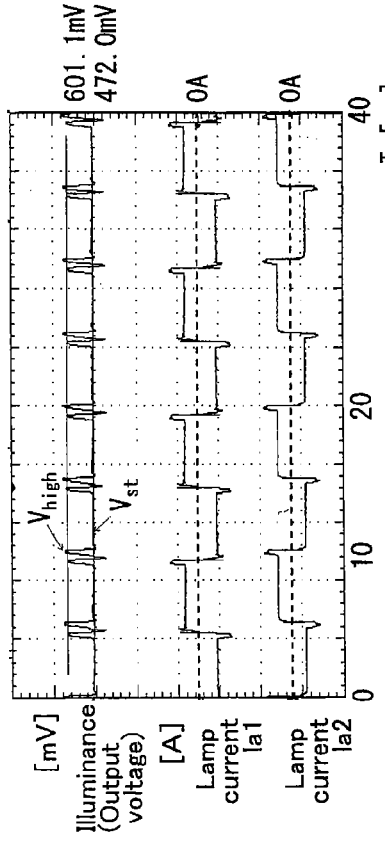

As shown in FIG. 5B, in the practical example 4, the normal value $V_{st}$ of the illuminance is 472.0 mV, the maximum value $V_{high}$ of the illuminance is 605.1 mV, the increase (change) in the illuminance is 133.1 mV, and the change rate is 28.2%.

Figure 5C:
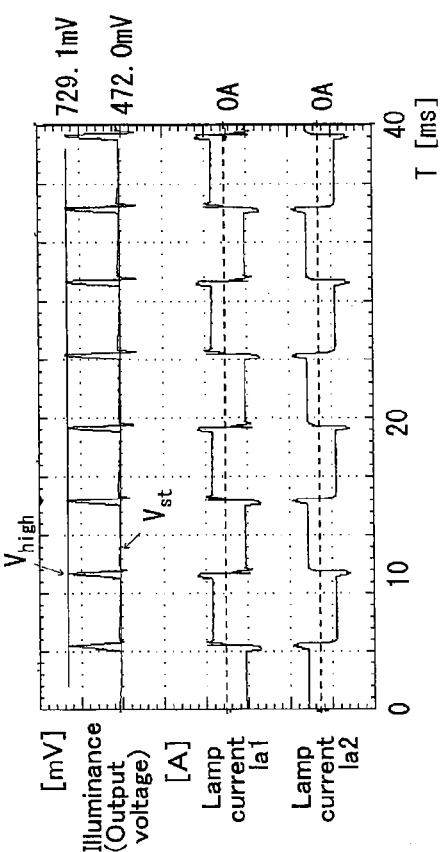

As shown in FIG. 5C, in the comparative example 3, the normal value $V_{st}$ of the illuminance is 472.0 mV, the maximum value $V_{high}$ of the illuminance is 737.1 mV, the increase (change) in the illuminance is 265.1 mV, and the change rate is 56.2%

Figure 5D:
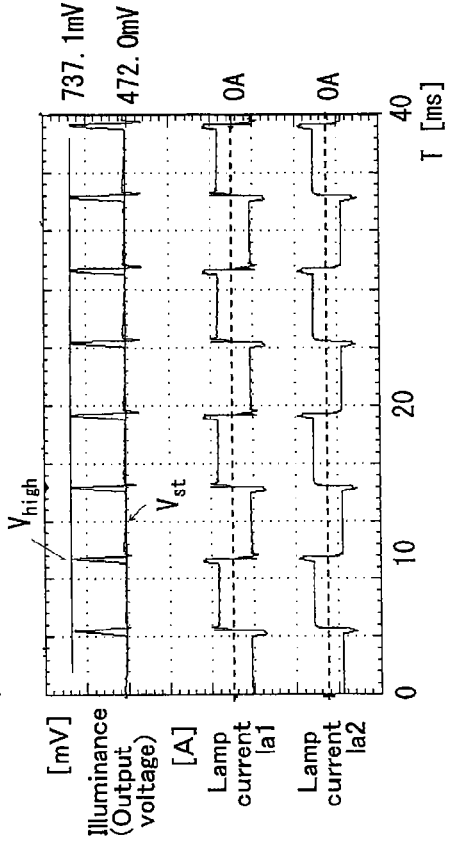

As shown in FIG. 5D, in the comparative example 4, the normal value $V_{st}$ of the illuminance is 472.0 mV, the maximum value $V_{high}$ of the illuminance is 729.1 mV, the increase (change) in the illuminance is 257.1 mV, and the change rate is 54.5%

Comparing the practical examples 3 and 4 with the comparative examples 3 and 4, the change rates (27.4%, 28.2%) of the illuminance of the practical examples 3 and 4 are as low as a half of the change rates (56.2%, 54.5%) of the illuminance of the comparative examples 3 and 4. In this way, when the raises of the lamp currents Ia1 and Ia2 do not overlap each other, the change in the illuminance, that is, the change in the luminous flux is smaller than when the raises of the lamp currents overlap.

Comparing the practical example 3 and the practical example 4, the change rate of the illuminance is almost the same. Thus, it can be said that the same effect can be achieved even when the phase differences are not the same, as long as the raises of the lamp currents Ia1 and Ia2 do not overlap.

The effect of reducing the change in the luminous flux of the entire lamp pertaining to the present embodiment has been described above. In addition to the effect of reducing the change in the luminous flux, the present embodiment also achieves another effect due to the fact that the raises of the lamp currents do not overlap, which is a long life of the lamp.

The following explains in detail how the lamp realizes a long life.

<Realizing a Long Life of Lamp>

First, the structures of the lamps 103a and 103b are explained in detail. Hereinafter, the lamps 103a and 103b may be collectively referred to as "the lamp 103".

The lamp 103 is enclosed with mercury as a light-emitting material, and has an arc tube in which a pair of tungsten electrodes substantially face each other. Arc discharge is generated between the pair of electrodes and thus light is emitted.

The arc discharge between the pair of electrodes instantaneously stops at the switching points between the positive and the negative of the alternating current (i.e. when the current value is 0 A), and then changes the discharge direction. When the discharge direction changes, the points between which the arc discharge occurs (hereinafter referred to as "the arc points"), which are formed at the tips of the electrodes, move in some cases, and hence the arc discharge tends to be distorted.

The arc points are formed at the tips of the electrodes that have reached high temperatures. The raising control is a conventional technique used for the purpose of fixing the arc points at the same points before and after the polarity switching of the alternating current (i.e. the switching of the discharge directions), by temporarily increasing the supply current value before the polarity switching and thereby increasing the temperatures of the respective arc points of the electrodes. It is believed that this control prevents the arc points from moving, and stables the arc discharge.

The lamp 103 mentioned above can be almost a point light source when the pair of electrodes are brought close to each other. The light collection efficiency of the projector 100, which reflects the light from the lamp with a concave reflecting mirror and collects the light, can be increased more as the lamp 103 is brought closer to a point light source.

However, as the cumulative lighting time increases, the tips of the pair of electrodes in the lamp 103 are gradually worn down. Thus, the distance between the electrodes gradually increases. In the projector 100, the efficiency of the light collection by the reflecting mirror decreases as the distance between the electrodes increases. Consequently, the luminous flux emitted from the projector 100 decreases. The lamp 103 is considered as having reached the end of its life when the decrease of the luminous flux has progressed.

In the projector 100 pertaining to the present embodiment, the lamps 103a and 103b face each other, and light from the lamps 103a and 103b is collected by the concave reflecting mirror, and is emitted toward the combining prism constituting the light collector 21, which is provided between the lamps 103a and 103b (see the section <Structure> of [Embodiment 1]).

However, a portion of light emitted from the lamp 103a to the combining prism passes by the combining prism, and enters into the reflecting mirror of the lamp 103b which faces the lamp 103a. The light entered into the reflecting mirror is reflected off the reflecting mirror, and is collected to travel toward the lamp 103b. Thus, a portion of the light reaches the lamp 103b in some cases. Consequently, the temperature of the lamp 103b is raised due to the energy of the light reaching thereto, and the temperatures of the electrodes of the lamp 103b are raised accordingly. In particular, when the value of the current supplied to the lamp 103a is increased by the raising control, the lamp luminous flux is increased accordingly, and the amount of light that reaches the lamp 103b increases. This further raises the temperatures of the electrodes of the lamp 103b. Regarding the lamp 103b, similarly to the lamp 103a, a portion of light emitted from the lamp 103b reaches the lamp 103a, and raises the temperatures of the electrodes of the lamp 103a.

Therefore, in the projector 100, when the respective raises of the current values supplied to the lamps 103a and 103b overlap each other, the temperatures of the electrodes of each of the lamp 103a and 103b are raised due to the increase of the supply current value, and are further raised due to the increase of the amount of the light emitted from the facing lamp. Hence, the electrodes are worn down particularly when the raises of the lamp currents occur. This increases the distance between the electrodes and shortens the life of the lamp.

In the present embodiment, in contrast, the raises of the lamp currents do not overlap each other. This means, in regard to the electrodes of the lamps 103a and 103b, that the temperature raise due to the increase of the supply current value and the temperature raise due to the increase of the amount of light emitted from the facing lamp do not occur at the same time. Thus, in comparison with the case where the two kinds of raise mentioned above occur at the same time, the temperature raises of the electrodes in the present embodiment are smaller. By reducing the temperature raises of the electrodes of the lamps, it is possible to reduce the worn down of the electrodes to be smaller than in the case where the raises occur at the same time. As a result, the present embodiment realizes long-life lamps.

The inventors of the present invention found that even in the case of, for example, a dual-lamp projector in which the raises of the lamp currents overlap each other and the luminous flux maintenance factor of the light emitted therefrom will be approximately 50% when cumulative lighting time reaches 2000 h, it is possible to maintain the luminous flux maintenance factor at approximately 70% when cumulative lighting time reaches 2000 h by causing the raises of the lamp currents not to overlap each other.

Here, the maintenance factor (%) mentioned above is obtained on the assumption that the luminous flux at the start of the lighting is at the reference level (i.e. 100%).

As described above, when the raises of the lamp currents do not overlap, the decrease in the luminous flux maintenance factor of the light emitted from the projector is smaller than in the case where the raises overlap. Thus, the present embodiment realizes long-life lamps.

Embodiment 3

Structure

FIG. 6 is a functional block diagram showing the structure of a dual-lamp projector pertaining to Embodiment 3 of the present invention.

The projector 100 pertaining to Embodiment 1 is a three-panel LCD projector having three liquid crystal panels, 23a, 23b and 23c. On the other hand, a projector 200 pertaining to the present embodiment is a single-panel DLP (Digital Light Processing: a trademark owned by Texas Instruments Incorporated in the U.S.) projector having a single DMD (Digital Micromirror Device) panel 225. The same components as the projector 100 shown in FIG. 1 are referred to with the same signs, and the explanations thereof are omitted for simplification.

The DMD panel 225, together with a light collector 221, lenses 222 and 223, a color wheel 224, a projection lens 226, and a rotary driver 227, constitute an optical unit 204.

The light collector 221 is composed of a rod integrator for example, and collects light emitted from the lamps 103a and 103b. The rotary driver 227 has a stepper motor. The rotary driver 227 drives the stepper motor and thereby rotates the color wheel 224, based on a control signal CN7 from the microcomputer 36.

Figures 6A, 6B:
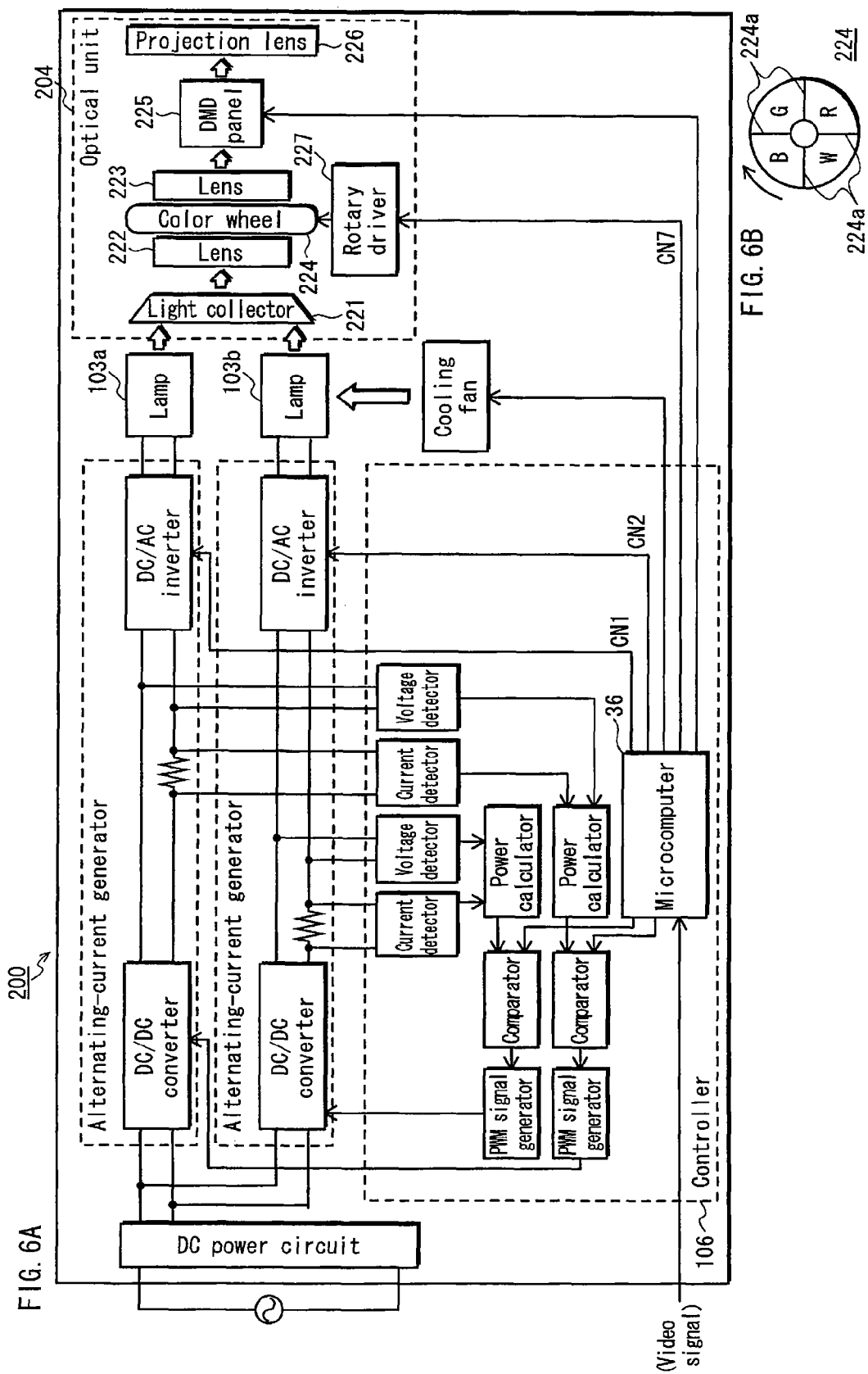
FIG. 6A is a functional block diagram showing the structure of a dual-lamp projector pertaining to Embodiment 3.
FIG. 6B shows the structure of a color filter included in the projector.

The color wheel 224 is provided on the optical path between the lenses 222 and 223. As shown in FIG. 6B, the color wheel 224 includes four filter segments arranged equiangularly (i.e. every 90°). The four filter segments include three filter segments corresponding to the three primary colors R, G and B, and a white-color filter segment (i.e. W) in addition.

The light emitted from the lamps 103a and 103b penetrates through the color wheel 224 rotated at a high speed, via the light collector 221 and the lens 222. Thus, the DMD panel 225 is irradiated with light of four colors, namely R, G, B and W by the time-division method. The DMD panel 225 is controlled by the microcomputer 36 so that the internal micro mirror reflects light according to the video signals that correspond to the respective colors. Thus, four color images due to the light of four colors R, G, B and W reflected off the DMD panel 225 pass through the projection lens 226 and are projected onto the screen. Since the four color images sequentially change from one after another at a high speed, they are perceived by human eyes as a desired projection of a mixed color.

In such single-panel DLP projectors, it is common that the timing of the polarity switching of the alternating current to be provided to the lamps is synchronized with the timing of the color switching of the color wheel being rotated. This is because the changes in the luminous flux is relatively inconspicuous when they occur in synchronization with the color switching, compared to the case where the changes occur while a same color is being projected.

Here, the timing of the color switching of the color wheel 224 is regarded as coinciding with the timing with which the light emitted from the lamp penetrates through the border lines 224a between the four colors shown in FIG. 6B.

<Waveform>

Figure 7:
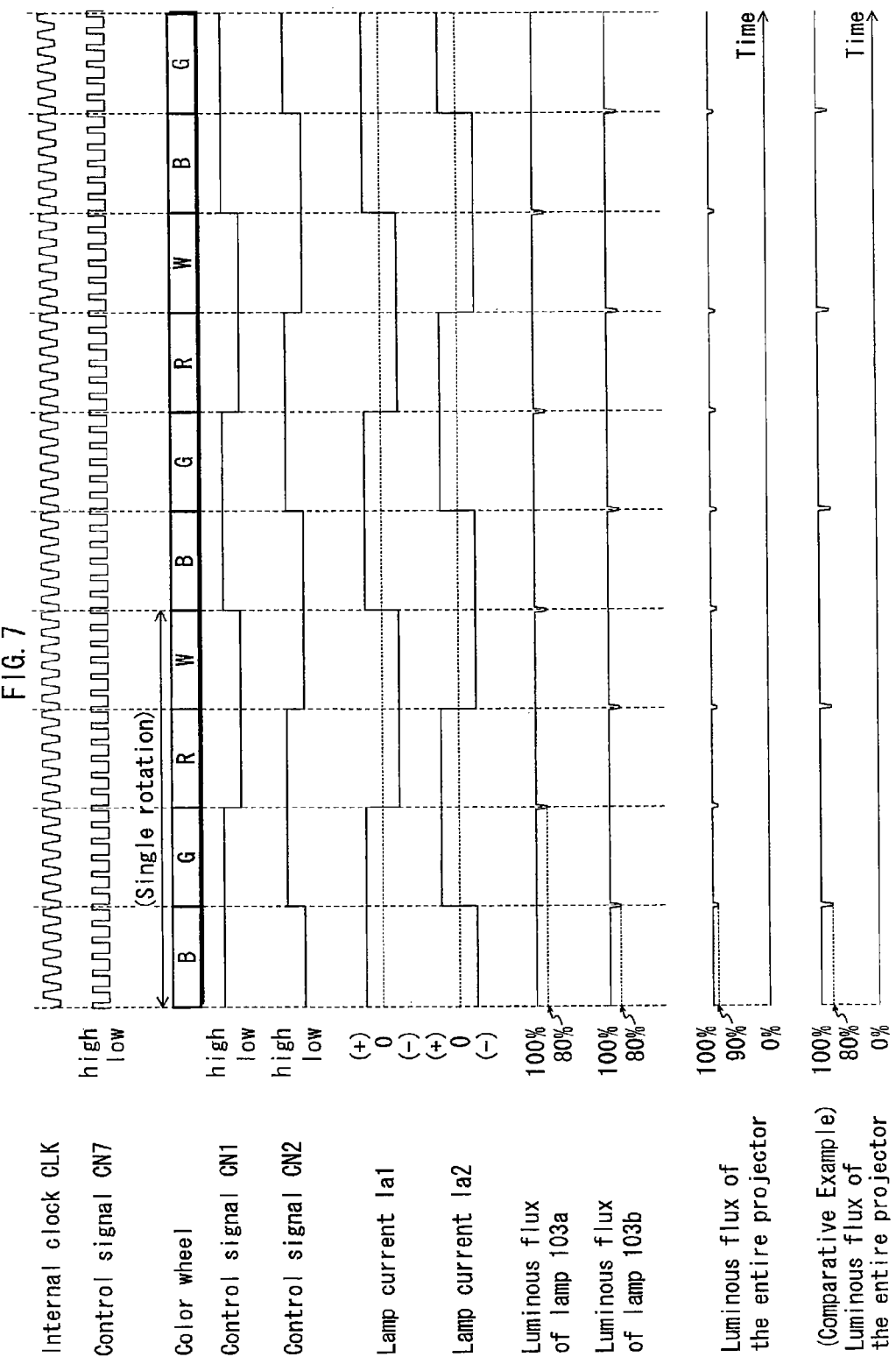
FIG. 7 is a timing chart showing control signals, lamp currents, and luminous fluxes of lamps pertaining to Embodiment 3.

FIG. 7 is a timing chart showing the control signals, color wheel, lamp currents and luminous fluxes of lamps, pertaining to Embodiment 3.

The control signal CN7 is generated by the microcomputer 36 counting the internal clock CLK with a counter and dividing the frequency of the internal clock CLK. The control signal CN7 is output at the high level with an interval of predetermined counts, and is otherwise output at the low level. The rotary driver 227 drives the stepper motor and rotates the color wheel 224 when the control signal CN7 is at the high level. In this example, the color wheel 224 is rotated by 15° every time the control signal CN7 is output at the high level.

Here, the control signal CN7 and the control signals CN1 and CN2 are adjusted with respect to each other such that the rotation period of the color wheel 224 coincides with the periods of the lamp currents la1 and la2. Furthermore, the control signal CN7 and the control signal CN1 are adjusted with respect to each other such that the phase of the rotation of the color wheel 224 coincides with the phase of the lamp current la1, and the control signal CN7 and the control signal CN2 are adjusted with respect to each other such that the phase of the lamp current la2 is displaced from the phase of the rotation of the color wheel 224 by 90°. The control signal CN7 and the control signals CN 1 and CN 2 are in synchronization, because they are generated based on the same internal clock, CLK.

As shown in FIG. 7, the polarity switching of each of the lamp currents la1 and la2 is synchronized with the color switching of the color wheel 224. Consequently, the changes in the luminous flux will be relatively inconspicuous compared to the case where the polarity switching of the lamp currents la1 and la2 is not synchronized with the color switching of the color wheel 224.

The control signals CN1 and CN2 are out of phase in this embodiment as well, and thus the change rate of the total of the luminous fluxes of the lamps 103a and 103b at the polarity switching of the lamp currents la1 and la2 is suppressed.

A projector pertaining to the present invention, a lighting device of a high-pressure discharge lamp used in the projector, and a method for lighting a high-pressure discharge lamp have been described above based on the embodiments. However, the present invention is not limited to the embodiments.

For example, the following modifications may be applied.

<Modifications>

(1) In the description of the embodiments above, a dual-lamp projector is explained as an example. However, the present invention is not limited to the use with a dual-lamp projector. The present invention may be adopted in a projector having more lamps, such as a quad-lamp projector and a sextuple-lamp projector. In such cases, an alternating-current generator including a DC/DC converter and a DC/AC inverter is provided for each lamp, for example.

(2) In the description of the embodiments above, three-panel LCD projector and a single-panel projector are explained as examples. However, the present invention is not limited to the use with such projectors. The present invention may be adopted in a three-panel DLP projector, a three-panel LCOS (Liquid Crystal On Silicon) projector having three reflective liquid crystal panels, etc.

(3) The embodiments described above have a structure in which the alternating currents to be supplied to the lamp 103a and 103b are generated based on the same internal clock CLK in order to synchronize the alternating currents. However, this is not essential. For example, the alternating currents to be supplied to the lamps 103a and 103b may be generated based on separate internal clocks (CLKs). If this is the case the internal clocks have to be in synchronization.

Figure 8B:
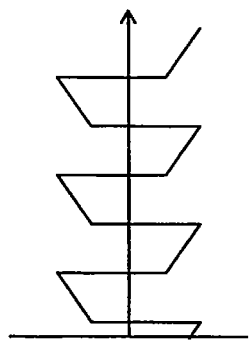
FIGS. 8A-8E show waveforms of an alternating current pertaining to Modifications.
Figure 8D:
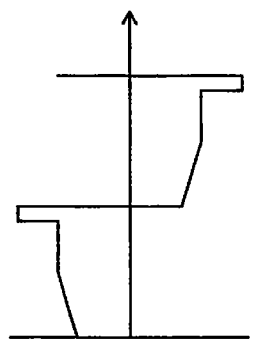
Figure 8A:
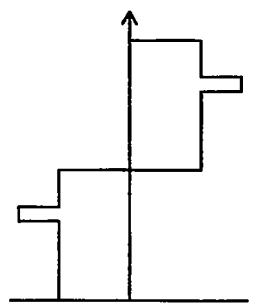
Figure 8C:
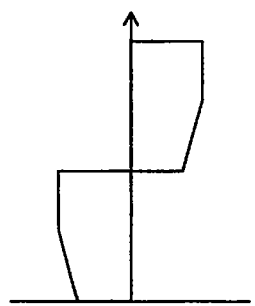
Figure 8E:
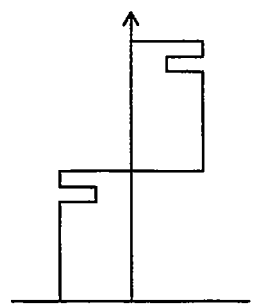

(4) In the second embodiment, the alternating currents to be supplied to the lamps have a waveform in which the current value I1 in the terminal interval k1 in the half cycle is greater than current value I2 in the rest of the half cycle, namely, the interval k2. However, this is not essential. For example, alternating currents having the waveforms shown in FIGS. 8A through 8E may be used. FIG. 8A shows an alternating current waveform in which the current value is raised at a middle point in the half cycle so as to be greater than the current value in the rest of the half cycle. FIG. 8B shows an alternating current waveform in which the current value in the half cycle is gradually raised instead of being instantaneously raised. FIG. 8C shows an alternating current waveform in which the current value in the half cycle is gradually raised in a certain interval from the beginning, and will be constant till the end. FIG. 8D shows an alternating current waveform in which the current value in the terminal interval of the half cycle is raised in addition to the raise shown in FIG. 8C. FIG. 8E shows an alternating current waveform in which the current value is temporarily lowered at a middle point in the half cycle. In the case where alternating current having any of the waveforms shown in FIG. 8A through 8D is used, it is possible to reduce the change in the luminous flux of the entire projector by displacing the phases such that the intervals in which the current values are the highest do not overlap each other. In the case where alternating current having the waveform shown in FIG. 8E is used, it is possible to reduce the change in the luminous flux of the entire projector by displacing the phases such that the intervals in which the current values are temporarily lowered do not overlap each other.

Figure 9A:
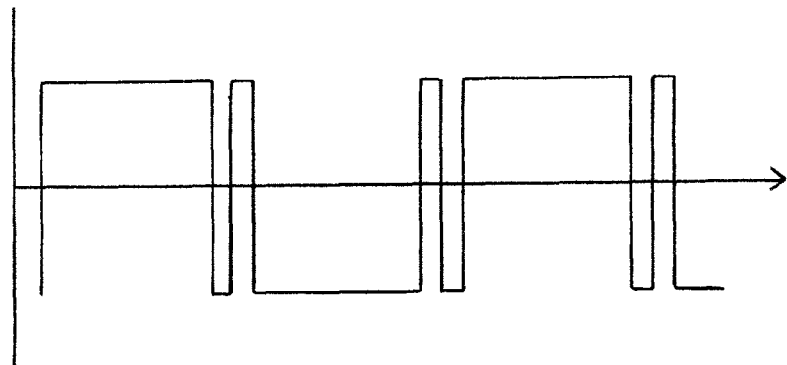
FIGS. 9A-9C show waveforms of an alternating current pertaining to Modifications.
Figure 9B:
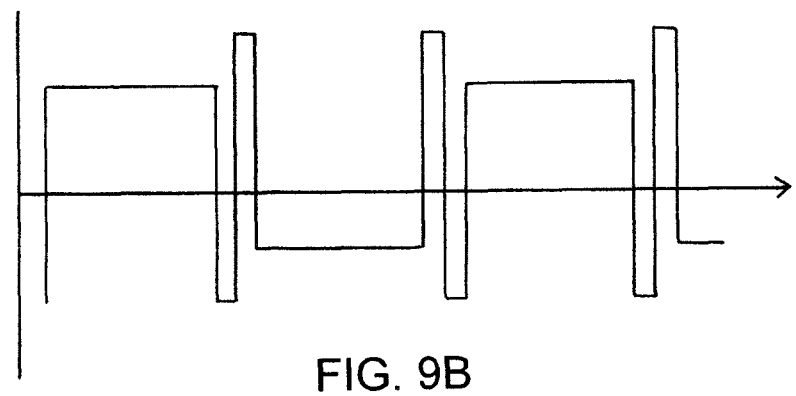
Figure 9C:
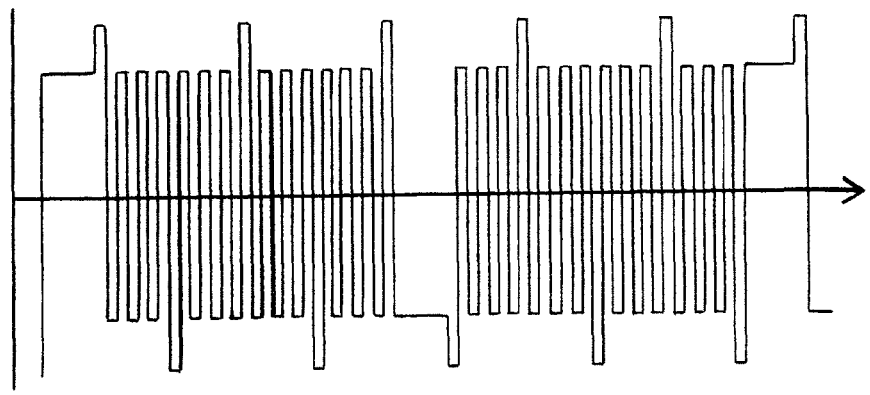

(5) Regarding the periods of the alternating currents to be supplied to the lamps, two or more different periods may be combined. For example, alternating currents having a waveform in which a high-frequency waveform pattern and a low-frequency pattern are combined, such as the waveforms shown in FIGS. 9A through 9C, may be used. FIG. 9A shows an alternating current waveform in which a first low-frequency half cycle section and a second high-frequency cycle section are alternately repeated so that the waveform sections follow each other in a consecutive order. FIG. 9B shows an alternating current waveform in which the current value is raised during a half of the high-frequency cycle shown in FIG. 9A. FIG. 9C shows an alternating current waveform in which one low-frequency half cycle and fourteen high-frequency cycles are alternately repeated, and furthermore, the current value in the terminal interval of the low-frequency half cycle is raised, and the current value of the high-frequency half cycle is raised every seven units, where one unit corresponds to a half cycle. A period of each of the half cycles constituting the first section is different from a period of each of the half cycles constituting the second section. Even in the case where two or more different periods of the alternating currents to be supplied to the lamps are combined as explained above, it is possible to reduce the change in the luminous flux of the entire projector by displacing the phases such that the timing of the polarity switching of the alternating current does not overlap the timing of the raises of the current value.

(6) In Embodiment 3, the color wheel includes four filter segments including three filter segments corresponding to the three primary colors R, G and B, and a white-color filter segment (i.e. W) in addition. However, this is not essential. For example, it is acceptable that the color wheel has a structure including only three filters for the three primary colors R, G and B, and not including a filter for white color. Moreover, the color wheel may include six filter segments including, in addition to the filter segments for the three primary colors R, G, and B, filter segments for their complementary colors, namely yellow, magenta, and cyan.

INDUSTRIAL APPLICABILITY

The present invention is broadly applicable to projectors that use high-pressure discharge lamps as light sources, a lighting device for a high-pressure discharge lamp used in the projector, and a method for lighting a high-pressure discharge lamp.

REFERENCE SIGNS LIST 11a, 11b DC/DC converter
12a, 12b DC/AC inverter
31a, 31b current detector
32a, 32b voltage detector
33a, 33b power calculator
34a, 34b comparator
35a, 35b PWM signal generator
36 microcomputer
100 projector
102a, 102b alternating-current generator
103a, 103b lamp
104 optical unit
106 controller
200 projector
204 optical unit
224 color wheel
224a border line
225 DMD panel
227 rotary driver
CN1, CN2, CN3, CN4, CN5, CN6, CN7 control signal
I1, I2 current value
k1 terminal interval (an interval in a half cycle)
k2 the other interval (the rest of the half cycle)

The invention claimed is:

1. A projector using first and second high-pressure discharge lamps as light sources, each high-pressure lamp having an arc tube in which a pair of electrodes are disposed to face each other, the projector comprising:
a first alternating-current generator configured to generate a first alternating current to be supplied to the first high-pressure discharge lamp, a frequency of the first alternating current changing according to a first control signal;
a second alternating-current generator configured to generate a second alternating current to be supplied to the second high-pressure discharge lamp, a frequency of the second alternating current changing according to a second control signal; and
a controller configured to input the first and the second control signals to the first and the second alternating-current generators respectively, and thereby control the first and the second alternating currents to have a same waveform and to be out of phase, wherein
the waveform of each of the first and the second alternating currents is composed of a first section, a second section, a third section, and a fourth section following each other in consecutive order, the first section consisting of a positive half-cycle of a first waveform having a first frequency, the second section consisting of one or more cycles of a second waveform having a second frequency, the third section consisting of a negative half-cycle of the first waveform having the first frequency, and the fourth section consisting of one or more cycles of the second waveform having the second frequency, and
the first frequency being lower than the second frequency.

2. The projector of claim 1, wherein the controller is further configured to, for each of the first and the second alternating currents, raise a current value during a predetermined interval in every half cycle thereof to be greater than in the rest of the half cycle, and the controller controls the first and the second alternating currents to be out of phase such that the predetermined interval of the first alternating current and the predetermined interval of the second alternating current do not overlap each other.

3. The projector of claim 1 further comprising:
a color wheel disposed in a path of light emitted from the first and the second high-pressure discharge lamps; and
a rotary driver configured to rotate the color wheel, wherein the controller is further configured to control:
the first alternating current such that polarity switching timing thereof coincides with color switching timing of the color wheel every two or more colors of the color wheel; and
the second alternating current such that polarity switching timing thereof coincides with the color switching timing of the color wheel every two or more colors of the color wheel, and does not coincide with the polarity switching timing of the first alternating current.

4. A lighting device for supplying alternating currents to, and thereby lighting, first and second high-pressure discharge lamps, comprising:
a first alternating-current generator configured to generate a first alternating current to be supplied to the first high-pressure discharge lamp, a frequency of the first alternating current changing according to a first control signal;
a second alternating-current generator configured to generate a second alternating current to be supplied to the second high-pressure discharge lamp, a frequency of the second alternating current changing according to a second control signal; and
a controller configured to input the first and the second control signals to the first and the second alternating-current generators respectively, and thereby control the first and the second alternating currents to have a same wavelength and to be out of phase, wherein
the waveform of each of the first and the second alternating currents is composed of a first section, a second section, a third section, and a fourth section following each other in consecutive order, the first section consisting of a positive half-cycle of a first waveform having a first frequency, the second section consisting of one or more cycles of a second waveform having a second frequency, the third section consisting of a negative half-cycle of the first waveform having the first frequency, and the fourth section consisting of one or more cycles of the second waveform having the second frequency, and the first frequency being lower than the second frequency.

5. A method for lighting a high-pressure discharge lamp, employed in a lighting device having:

a first alternating-current generator configured to generate a first alternating current to be supplied to a first high-pressure discharge lamp, a frequency of the first alternating current changing according to a first control signal;

a second alternating-current generator configured to generate a second alternating current to be supplied to a second high-pressure discharge lamp, a frequency of the second alternating current changing according to a second control signal; and a controller configured to control the first and the second alternating-current generators, the method comprising the step of:

inputting the first control signal and the second control signal respectively to each of the first and the second alternating-current generators to control the first and the second alternating currents to have a same waveform and to be out of phase, the waveform of each of the first and the second alternating currents composed of a first section, a second section, a third section and a fourth section following each other in consecutive order, the first section consisting of a positive half-cycle of a first waveform having a first frequency, the second section consisting of one or more cycles of a second waveform having a second frequency, the third section consisting of a negative half-cycle of the first waveform having the first frequency, and the fourth section consisting of one or more cycles of the second waveform having the second frequency, and the first frequency being lower than the second frequency.

6. The projector of claim 1 wherein the controller is further configured to control the first and the second alternating currents to have a same wavelength and to be out of phase, the wavelength produced is such that the rises in a current to each lamp do not overlap each other, thereby reducing a residual photonic feedback from a reflective mirror onto the electrodes and extending an effective life of the electrodes in the arc tube.

* * * * *